US010230771B2

(12) United States Patent
Moore et al.

(10) Patent No.: US 10,230,771 B2
(45) Date of Patent: Mar. 12, 2019

(54) MEDIA SESSION

(71) Applicant: Microsoft Technology Licensing, LLC, Redmond, WA (US)

(72) Inventors: Timothy Mark Moore, Bellevue, WA (US); Tin Qian, Redmond, WA (US); Rajesh Gunnalan, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 300 days.

(21) Appl. No.: 15/336,408

(22) Filed: Oct. 27, 2016

(65) Prior Publication Data

US 2018/0124123 A1     May 3, 2018

(51) Int. Cl.
    *H04L 29/06*     (2006.01)
    *H04L 29/12*     (2006.01)
    *H04L 29/08*     (2006.01)

(52) U.S. Cl.
CPC ...... *H04L 65/1069* (2013.01); *H04L 61/2514* (2013.01); *H04L 61/2575* (2013.01); *H04L 61/2589* (2013.01); *H04L 67/28* (2013.01)

(58) Field of Classification Search
None
See application file for complete search history.

(56) References Cited

U.S. PATENT DOCUMENTS 7,620,033 B2    11/2009   Chu et al.
7,643,414 B1    1/2010    Minhazuddin
8,099,500 B2    1/2012    Deason
8,289,845 B1 *   10/2012   Baldonado .............. H04L 43/50
                                                                     370/229
8,385,326 B2    2/2013    Khan et al.
(Continued)

OTHER PUBLICATIONS

J. Rosenberg, "Interactive Connectivity Establishment (ICE): A Protocol for Network Address Translator (NAT) Traversal for Offer/Answer Protocols", Apr. 2010, Internet Engineering Task Force (IETF), ISSN: 2070-1721, p. 30 (Year: 2010).*
(Continued)

*Primary Examiner* — Philip J Chea
*Assistant Examiner* — Hassan A Khan
(74) *Attorney, Agent, or Firm* — NovoTechIP International PLLC

(57) ABSTRACT

A media session between a first device and a second device is established. The following candidate pairs are determined at the first device, by exchanging network addresses between the devices: (i) a relayed-relayed candidate pair comprising a first media relay server network address and a second media relay server, and (ii) at least one alternative candidate pair. Connectivity checks are performed for at least the alternative candidate pair to determine whether or not the alternative candidate pair is valid. However, the media session is established initially using the relayed-relayed candidate pair without any connectivity checks having been performed by the devices for the relayed-relayed candidate pair and before the connectivity checks for the alternative candidate pair have been completed. If the alternative candidate pair is determined to be valid in the connectivity checks, the established media session is switched to the alternative candidate pair in response.

20 Claims, 9 Drawing Sheets

(56) References Cited

U.S. PATENT DOCUMENTS

| | | | |
|---|---|---|---|
| 8,699,366 B2 | 4/2014 | Rodrig | |
| 8,990,411 B2 | 3/2015 | Bergman et al. | |
| 2004/0136324 A1* | 7/2004 | Steinberg | H04L 12/5692 370/238 |
| 2006/0104199 A1* | 5/2006 | Katukam | H04L 12/43 370/216 |
| 2008/0043716 A1* | 2/2008 | Toombs | H04L 45/00 370/351 |
| 2008/0080568 A1 | 4/2008 | Hughes et al. | |
| 2008/0304419 A1* | 12/2008 | Cooper | H04L 29/125 370/248 |
| 2009/0113067 A1 | 4/2009 | Andreasen | |
| 2009/0201937 A1* | 8/2009 | Bragg | H04L 12/4625 370/401 |
| 2010/0027418 A1* | 2/2010 | Rodrig | H04L 41/147 370/235 |
| 2010/0217874 A1* | 8/2010 | Anantharaman | H04L 29/12528 709/228 |
| 2011/0208802 A1* | 8/2011 | Gunnalan | H04L 41/0893 709/203 |
| 2012/0158974 A1* | 6/2012 | Perumal | H04L 29/12528 709/227 |
| 2014/0150075 A1* | 5/2014 | Ryner | G06F 21/45 726/5 |
| 2015/0078332 A1 | 3/2015 | Sidhu et al. | |
| 2016/0164787 A1* | 6/2016 | Roach | H04L 47/125 370/235 |
| 2016/0174239 A1* | 6/2016 | Tietsch | H04L 61/2575 370/329 |
| 2017/0295475 A1* | 10/2017 | Patel | H04W 4/10 |
| 2018/0007124 A1* | 1/2018 | Otsuya | H04L 12/66 |
| 2018/0241783 A1* | 8/2018 | Pastro | H04L 65/1006 |

OTHER PUBLICATIONS

"ICE: Interactive Connectivity Establishment", Retrieved on: Feb. 9, 2016 Available at: http://www.vocal.com/networking/ice-interactive-connectivity-establishment/, 5 pages.

* cited by examiner

MEDIA SESSION

TECHNICAL FIELD

The present invention relates to the establishment of a media session between a first device and a second device.

BACKGROUND

A communication network may for example be a packet-based network and/or an internet. A network typically includes different types of network nodes, such as user devices, routers, network address translators (NATs), proxy servers, media relay servers etc., which perform different functions within the network. For instance, routers route packets between individual networks of an internet. NATs also perform such routing, as well as performing network address translation i.e. to mask the network address of the sender. Communication between two communicating nodes, such as user devices, may be via other nodes of the network, i.e. intermediate nodes such as routers, NATs and media relay servers. Every active network interface (e.g. of a user device, server etc.) connected to the network is assigned a network address, e.g. IP (Internet Protocol) address, so that is data can be routed thereto via the network. This may for example be assigned by an ISP (Internet Service Provider) in the case of a public network, or other network administrator.

A media session may be established between two endpoints, such as user devices, connected via a communication network so that real-time media can be transmitted and received between those endpoints via the network. The endpoints run client software to enable the media session to be established. The media session may be a Voice or Video over IP (VoIP) session, in which audio and/or video data of a call is transmitted and received between the endpoints in the VoIP session as media streams. Endpoints and other types of network node may be identified by a network address, such as a transport address. A transport address is formed of an IP address and a port number identifying a port associated with the IP address. A media session being may be established between transport addresses associated with the endpoints.

An example of a media session is a SIP ("Session Initiation Protocol") media session. SIP signalling, e.g. to establish or terminate a call or other communication event, may be via one or more SIP (proxy) server(s). To this end, the SIP proxy forwards SIP requests (e.g. "INVITE", "ACK", "BYE") and SIP responses (e.g. "100 TRYING", "180 RINGING", "200 OK") between endpoints. In contrast to a media relay server, the media (e.g. audio/video) data itself does not flow via a basic SIP proxy i.e. the proxy handles only signalling, though it may in some cases be possible to combine proxy and media relay functionality in some cases. To establish the media session, one of the endpoints may transmit a media session request to the other endpoint. Herein, an endpoint that initiates a request for a media session (e.g. audio/video communications) is called an "initiating endpoint" or equivalently a "caller endpoint". An endpoint that receives and processes the communication request from the caller is called a "responding endpoint" or "callee endpoint". Each endpoint may have multiple associated transport addresses e.g. a local transport address, a transport address on the public side of a NAT, a transport address allocated on a relay server etc. During media session establishment, for each endpoint, a respective address may be selected for that endpoint to use to transmit and receive data in the media session. For example, the addresses may be selected in accordance with the ICE ("Interactive Connectivity Establishment") protocol. Once the media session is established, media can flow between those selected addresses of the different endpoints.

A known type of media relay server is a TURN (Traversal Using Relays around NAT) server, e.g. a TURN/STUN (Session Traversal Utilities for NAT) incorporating both TURN and STUN functionality. The network may have a layered architecture, whereby different logical layers provide different types of node-to-node communication services. Each layer is served by the layer immediately below that layer (other than the lowest layer) and provides services to the layer immediately above that layer (other than the highest layer). A media relay server is distinguished from lower-layer components such as routers and NATS in that it operates at the highest layer (application layer) of the network layers. The application layer provides process-to-process connectivity. For example, the TURN protocol may be implemented at the application layer to handle (e.g. generate, receive and/or process) TURN messages, each formed of a TURN header and a TURN payload containing e.g. media data for outputting to a user. The TURN messages are passed down to a transport layer below the network layer. At the transport layer, one or more transport layer protocols such as UDP (User Datagram Protocol), TCP (Transmission Control Protocol) are implemented to packetize a set of received TURN message(s) into one or more transport layer packets, each having a separate transport layer (e.g. TCP/UDP) header that is attached at the transport layer. The transport layer provides host-to-host (end-to-end) connectivity. Transport layer packets are, in turn are passed to an internet layer (network layer) below the transport layer. At the internet layer, an internet layer protocol such as IP is implemented to further packetize a set of received transport layer packet(s) into one or more internet layer (e.g. IP) packets, each having a separate network layer (e.g. IP) header that is attached at the internet layer. The internet layer provides packet routing between adjacent networks. Internet layer packets are, in turn, passed down to the lowest layer (link layer) for framing and transmission via the network. In the reverse direction, data received from the network is passed up to the IP layer, at which network layer (e.g. IP) headers are removed and the remaining network layer payload data, which constitutes one or more transport layer packets including transport layer header(s), is passed up to the transport layer. At the transport layer, transport layer (e.g. UDP/TCP) headers are removed, and the remaining payload data, which constitutes one or more TURN messages in this example, is passed up to the application layer for final processing, e.g. to output any media data contained in them to a user, or for the purposes of relaying the TURN message(s) onwards. This type of message flow is implemented at both endpoints and TURN servers i.e. endpoints and TURN servers operates at the application layer in this manner.

An IP address uniquely identifies a network interface of a network node within a network, e.g. within a public network such as the Internet or within a private network. There may be multiple application layer processes running in that node, and a transport address (IP address+port number) uniquely identifies an application layer process running on that node. That is, each process is assigned its own unique port. The port (or equivalently "socket") is a software entity to which messages for that process can be written so that they become available to that process. An IP address is used for routing at the internet layer by internet layer protocols (e.g. IP) and constitutes an internet layer network address that is included in the headers of internet layer packets, whereas the port number is used at the transport layer by transport layer protocols e.g. TCP/UDP to ensure that received data is passed to the correct application layer process. A transport layer packet includes a port number in the header, which identifies the process for which that packet is destined.

In contrast to media relay servers, routers typically only operate at the internet layer, routing IP packets based on IP addresses in IP packet headers. Notionally, NATs also only operate at the network layer and are distinguished from basic routers in that NATs modify IP headers during routing to mask the IP address of the source. However, increasingly NATs perform modifications at the transport layer, i.e. to transport layer packet headers, so at to also mask the source port number e.g. to provide one-to-many network address translation.

In the context of ICE, transport addresses available to an endpoint—e.g. its host address, a public address mapped to the host address at a NAT, and a transport address of TURN server that can receive media data from the other endpoint on behalf of that endpoint and relay it to that endpoint—are referred to as that endpoints candidates. They are determined by that endpoint and communicated to the other endpoint in a candidate gathering phase. Each endpoint then determines a set of "candidate pairs", i.e. a set of possible pairings of the endpoint own addresses with the other endpoint's addresses. Connectivity checks are then performed for each candidate pair to determine whether or not that candidate pair is valid, i.e. to determine whether probe data sent from an endpoint's own address in that pair to the other address in that pair is successfully received by the other endpoint. A media session is then established between the endpoints using a selected candidate pair that was determined to be valid in the connectivity checks. Media data of the media session is transmitted from each of the endpoints to the network address of the other endpoint in the selected candidate pair. The progress of the connectivity checks and status of the candidate pairs is tracked by respective ICE state machines implemented at the endpoints.

That is, each endpoint may have multiple associated transport addresses e.g. a local transport address, a transport address on the public side of a NAT, a transport address allocated on a relay server etc. During media session establishment, for each endpoint, a respective address is selected for that endpoint to use to transmit and receive data in the media session. For example, the addresses may be selected in accordance with the ICE ("Interactive Connectivity Establishment") protocol. Once the media session is established, media can flow between those selected addresses of the different endpoints. To select a path, a list of candidate pairs is generated, each of which comprises a network address available to a first of the endpoint—"local" candidates from the perspective of the first endpoint, though note that "local" in this context is not restricted to host addresses on its local interface, and can also include reflexive addresses on the public side of the NAT, or a relay network address of a media relay server that can relay media data to the first endpoint (relayed network address)—and a network address available to the second endpoint ("remote" candidates from the perspective of the first endpoint). Every possible pairing of local and remote candidates may be checked to determine whether or not it is valid, by sending one or more probe messages from the local address to the remote address during the connectivity checks.

SUMMARY

Herein the term "call setup time" at an endpoint is used as shorthand to mean a duration from the time at which a media session instigation signal is received at the initiating endpoint, and the time at which the media session is successfully established causing media data to begin flowing between the endpoints in response. The media session instigation signal can for example be a media instigation instruction at an initiating endpoint received from a user or that is generated automatically, or an initial offer message received at a responding endpoint from an initiating endpoint. For the avoidance of doubt, it is noted that whilst the media session can part of an audio or video call between users, the present invention is not limited to this and the media session in question could be established in, say, a video on-demand or other video streaming context.

In conventional ICE, the media session cannot be established until the candidate gathering phase has been completed, and connectivity checks have been performed for at least one valid candidate pair. This can increase the call set up time significantly, particularly in networks with highly constrained bandwidth as this significantly reduces the rate at which probe data can be exchanged in the connectivity checks, which in turn significantly increases the duration of the connectivity check phase.

The inventors of the present invention have recognised that a so relayed-relayed candidate pair is all but guaranteed to work in practice, and so does not need to be checked. That is, a candidate pair corresponding to a route such that media data is relayed via one or more media relay servers in both directions. For example, the TURN-TURN candidate pair in the context of ICE. In order to reduce the call set up time, a media session is established immediately in response to a session instigation signal using an (un-checked) relay-relay candidate pair.

Only using a relayed-relayed candidate pair for every media session would be expensive in term of require media relay server resources. Hence, connectivity checks are still performed for at least one alternative candidate pair, and if a valid alternative candidate pair is found, the media session is switched to the cheaper alternative.

That is, the connectivity checks are not completed until after the media session has been established using the relayed-relayed candidate pair, and the media session is established without performing connectivity checks for the relayed-relayed candidate pair first. This is different to conventional ICE in which a media session is only established using a candidate pair that has been subject to connectivity checks and which has been determined to be valid in those checks. Moreover, in conventional ICE the candidate pairs are prioritized for the connectivity checks such that the TURN-TURN candidate pair is only checked when all other available candidate pairs have been check and determined to be invalid i.e. it is only used as a last resort when all other option have been exhausted (which can significantly delay the call set up time in this scenario).

According to various aspects of the present invention, a media session between a first device and a second device is established. The following candidate pairs are determined at the first device, by exchanging network addresses between the devices: (i) a relayed-relayed candidate pair comprising a first media relay server network available to the first device and a second media relay server network address available to the second device, and (ii) at least one alternative candidate pair comprising a first network address available to the first device and a second network address available to the second device. At least one of the network addresses of the alternative candidate pair is a host address (i.e. a network address of a local network interface of one of the devices) or reflexive address (i.e. a network address on the public side of a NAT mapped to a host network address of one of the device).

Connectivity checks are performed for at least the alternative candidate pair to determine whether or not the alternative candidate pair is valid. However, the media session is established initially using the relayed-relayed candidate pair without any connectivity checks having been performed by the devices for the relayed-relayed candidate pair and before the connectivity checks for the alternative candidate pair have been completed. If the alternative candidate pair is determined to be valid in the connectivity checks, the established media session is switched to the alternative candidate pair in response.

A first aspect of the present invention is directed to a method of establishing a media session between a first device and a second device. The method comprises the first device implementing the following steps.

The first device determines the following, by exchanging network addresses between the devices:

A relayed-relayed candidate pair comprising a first media relay server network available to the first device and a second media relay server network address available to the second device, and At least one alternative candidate pair comprising a first network address available to the first device and a second network address available to the second device. At least one of the network addresses of the alternative candidate pair is a host address or reflexive address. The other network address can also be a hot or reflexive address, or it can be a relayed address such as the first or second media relay server network address).

In response to a session instigation signal at the first device the following steps are performed at the first device.

A media session is established between the devices using the relayed-relayed candidate pair, and Connectivity checks are performed by the devices for at least the alternative candidate pair to determine whether or not it is valid.

The media session is established using the relayed-relayed candidate pair without any connectivity checks having been performed by the devices for the relayed-relayed candidate pair and before the connectivity checks for the alternative candidate pair have been completed, i.e. so that initial media data of the established media session is relayed between the devices via the media relay server network addresses whilst the connectivity checks are still being performed for the alternative candidate pair. If the alternative candidate pair is determined to be valid in the connectivity checks, thereafter the alternative candidate pair is used by the devices for the media session instead of the relayed-relayed candidate pair, i.e. so that subsequent media data of the established media session is transmitted and received between the devices using the alternative candidate pair instead. That is, the established media session is switched to the alternative candidate pair in response to determining that the alternative candidate pair is valid.

The connectivity checks are performed for the alternative candidate pair by transmitting and receiving probe data between the devices using the alternative candidate pair. However, the media session is established using the relayed-relayed candidate pair without any probe data first having been transmitted or received between the devices using the relayed-relayed candidate pair.

The probe data and the initial media data are thus transmitted and received in parallel, i.e. transmission and reception of the initial media data commences before the devices have finished exchanging the probe data. The media session may be established shortly before the connectivity checks commence, or after they have commenced whilst they are still ongoing. In any event, the media session is established before the connectivity checks have been completed, such that the initial media data of the media session begins flowing between the devices before they have finished exchanging the probe data between them in the connectivity checks.

Note that the media session is established using the relayed-relayed candidate pair without any connectivity check having been performed for the relayed-relayed candidate pair in the sense that, in response to the session instigation signal, the initiating device begins transmitting and receiving media data via the media relay server network addresses without checking first that the candidate pair is valid. This does not exclude the possibility of connectivity checks being performed for that candidate pair at some later time (though this is not generally expected to be necessary).

Because at most one of the network addresses of the alternative candidate pair is a host or reflexive address, after the switch to this candidate pair the subsequent media data is relayed via a media relay server in at most one direction. That is the subsequent media data is transmitted between the devices directly (i.e. not via a media relay server) in one or both directions after the switch.

In embodiments, the probe data and the initial media data may be transmitted and received between the devices using a shared bandwidth resource (e.g. a shared network connection). Preferably, the steps further comprise detecting at the first device a condition of constrained bandwidth for the shared bandwidth resource.

The establishing of the media session using the relayed-relayed candidate pair may be in response to the detection of the constrained bandwidth condition. That is, such that the media session is established initially via an unchecked relayed-relayed path only used when bandwidth is severely constrained.

That is, said establishment of the media session using the relayed-relayed candidate pair may be performed in response to said detection of the constrained bandwidth condition.

In addition, (or alternatively), the probe data may be transmitted and received between the devices in the connectivity checks at a data rate that is restricted to account for the constrained bandwidth condition.

"Shared" bandwidth resource in this context means shared between the probe data and the (initial) media data, i.e. the same bandwidth resource is used for both types of data. That is, the shared bandwidth resource provides an available bandwidth, the more of which is consumed by the probe data the less is available for the media data (and vice versa). Thus, in this context, reducing the rate at which the probe data is transmitted and received ensures a greater portion of the available bandwidth is available for the media session whilst the connectivity checks are ongoing. That is, for the initial media data that is transmitted and received whilst the connectivity checks are being performed in parallel.

In embodiments, initial media data of the established media session and probe data of the connectivity checks are transmitted and received between the devices via at least one shared connection, and the steps may further comprise detecting at the first device a condition of constrained bandwidth for the shared connection.

Said establishment of the media session using the relayed-relayed candidate pair may be performed in response to said detection of the constrained bandwidth condition.

The probe data may be transmitted and received between the devices in the connectivity checks at a data rate that is restricted to account for the constrained bandwidth condition.

The probe data may be transmitted and received between the devices at a lower data rate than the initial media data.

Alternatively or in addition, the probe may be transmitted and received within a predetermined bandwidth cap.

The shared connection may be a local network connection between the first device and a network, and the constrained bandwidth condition may be detected at the first device by determining an available bandwidth of the local network connection and comparing it with a bandwidth threshold.

Alternatively, the shared connection may be a remote network connection between the second device and a network, and the constrained bandwidth condition may be detected at the first device by receiving at the first device from the second device a message indicating the constrained bandwidth condition.

Alternatively or additionally, the condition of constrained bandwidth may be detected based on an exchange of messages between the first device and a server that is performed to obtain, at the first device, the first media relay server network address available to the first device. That is, the condition of constrained bandwidth may be detected based on the messages that were exchanged in order to obtain the first media relay server network address initially. The server may for example be TURN server, and the messages may be exchanged as part of a candidate gathering phase to obtain the first media relay server network address, which is a TURN candidate in this context.

For example, the condition of constrained bandwidth may be detected based on a round-trip time of the message exchange and/or a number of retries for the message exchange.

The relayed-relayed candidate pair and the alternative candidate pair may be determined at the first device in a candidate gathering phase instigated in response to the session instigation signal.

The first media relay server network address may be determined by the first device before the session instigation signal is received.

The alternative candidate pair may be determined at the first device in a candidate gathering phase instigated in response to the session instigation signal, and the media session may be established using the relayed-relayed candidate pair before the candidate gathering phase has been completed.

The relayed-relayed candidate pair may further comprise a first multiplexing identifier for multiplexing over the first media relay server network address and a second multiplexing identifier for multiplexing over the second media relay server network address.

A second aspect of the present invention is directed to a computer program product comprising code stored on a computer-readable storage medium and configured, when executed on a processor of a first device, to implement the method of the first aspect or any embodiment thereof.

A third aspect of the present invention is directed to a first device for establishing a media session between the first device and a second device, the first device comprising a network interface and a processor configured to implement the method of the first aspect or any embodiment thereof so as to establish the media session between the first device and the second device via the network interface.

Note, this Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Also note that whilst the term "media" as used herein in the context of media session, media data and the like can refer to audio and/or video, it is not limited to this and can relate to other form of media session, such as instant message communication sessions, application sharing (e.g. screen sharing, shared whiteboard sessions etc.), file sharing etc. The techniques described herein provide a generic transport mechanism which can be used for any media type or format.

BRIEF DESCRIPTION OF FIGURES

To aid understanding of the subject matter and to show how the same may be carried into effect, reference will now be made by way of example only to the following drawings in which.

Like reference signs denote corresponding features in the figures.

DETAILED DESCRIPTION OF EXAMPLE EMBODIMENTS

For severely constrained networks, the ICE state machine is configured with a bandwidth limit (cap) to use (e.g. 5 kbps). For such cases a call is started on a TURN-TURN path. The other paths can be probed at a much slower pace than regular connectivity checks within the configured bandwidth cap, as the call is conducted initially via the TURN-TURN path in parallel. If a valid alternative path is found in the connectivity checks, then the media is switched to the alternative path from the TURN-TURN path.

The TURN-TURN path is guaranteed to work, but at the same time is the most expensive in terms of the cost of deploying TURN servers. Using the TURN-TURN path by default for every call where bandwidth is severely constrained guarantees a reduced call setup time (because the TURN-TURN path is guaranteed to work), whilst minimizing the cost in terms of TURN server resources by switching to a less expensive path for the call if and when this becomes possible.

In the context of ICE, the "TURN-TURN" path means a path through the network wherein media data is relayed between the endpoints via one or more media relay (i.e. TURN) servers in both directions. That is, from the initiating endpoint to the responding endpoint via the responding endpoint's TURN candidate, and from the responding endpoint to the initiating endpoint via the initiating endpoint's TURN candidate.

Figure 1:
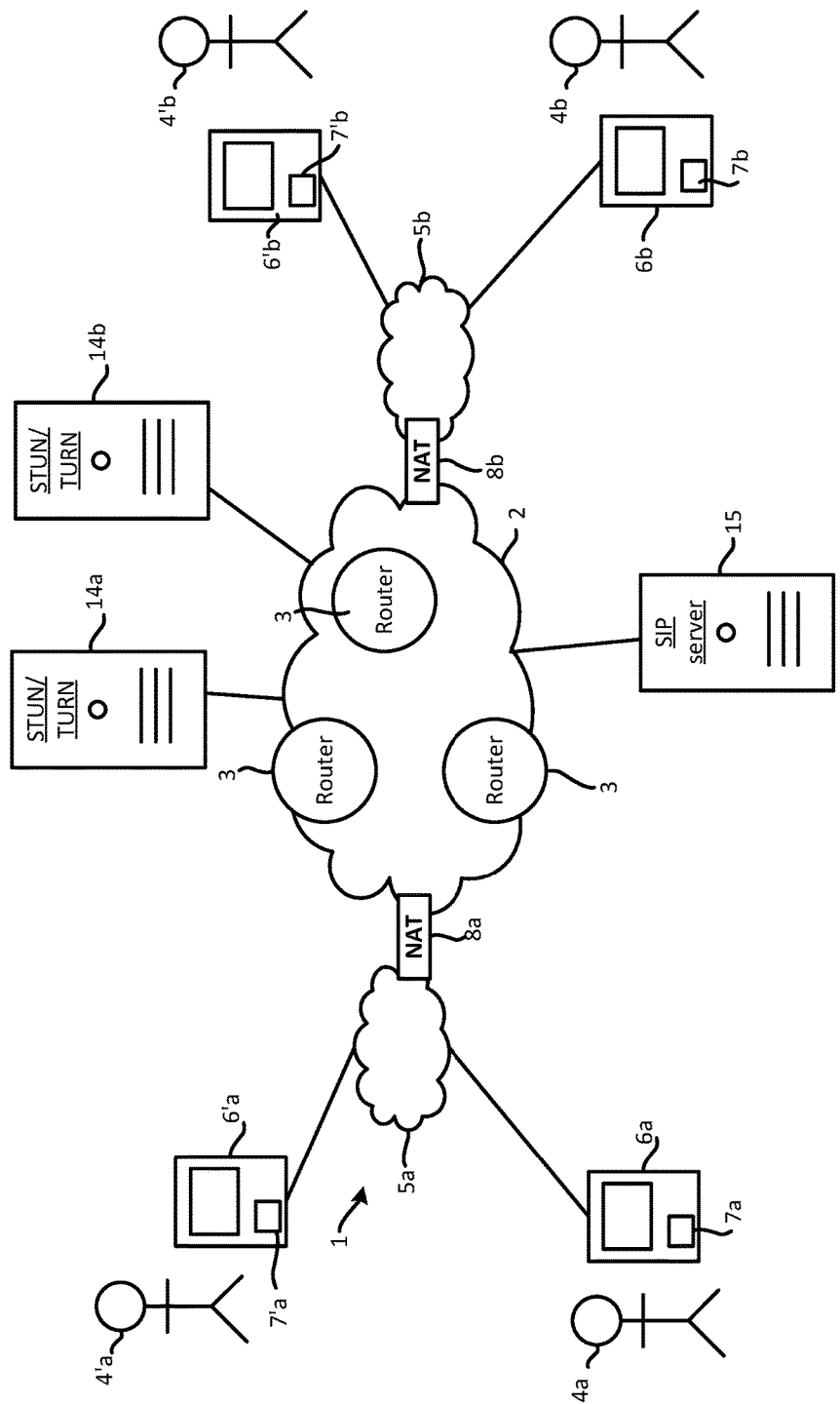
FIG. 1 shows a communication system.

FIG. 1 is a schematic illustration of a communication system, which comprises: a public network 2; first and second endpoints, which are first and second user devices 6a, 6b operated by first and second users 4a, 4b; third and fourth endpoints, which are third and fourth user devices 6'a, 6'b operated by third and fourth users 4'a, 4'b; one or more media relay servers 14 (two are shown by way of example); and one or more proxy servers (one is shown by way of example), such as SIP server(s) 15.

The public network 2 is a public, packet-based internet (that is, a system of interconnected individual networks) e.g. the Internet, having a public address space. The public network 2 comprises a plurality of routers 3 which route traffic between different individual networks (not shown) of the public network 2.

The user devices 6a, 6'a are connected to, and are network nodes of, a first packed-based private network 5a and the user devices 6b, 6'b are connected to, and are network nodes of, a second packet-based private network 5b.

Each node of a private network has a respective private network address in a private address space of that private network which other nodes connected to that same private network (and only such nodes) can use to communicate with that node over that private network (and only over that private network). That address is private in that it cannot be used to communicate with that node by devices which are not connected to that same private network e.g. it cannot be used within the public network 2. Moreover, whilst that address is unique within that private network, other nodes may use the same network address within different networks (e.g. the first and second user devices 6a, 6b might happen to have the same private network address but which is useable to communicate with the first user device 6a only within the first private network 5a and which is useable to communicate with the second user device 6b only within the second private network 5b).

To enable nodes of the first and second private networks 5a, 5b to communicate with the public network 2, they are connected to the public network 2 via a first and a second Network Address Translator (NAT) 8a, 8b respectively. Each NAT 8a, 8b has both a respective private network addresses in the applicable private address space (referred to as an address on the private side of that NAT) and a respective public network address in the public address space of the public network 2 (referred to as an address on the public side of that NAT). Thus, not only can nodes of the first and second private networks 5a, 5b communicate with the first and second NATs 8a, 8b respectively using those NATs' private network addresses, but nodes outside of that private network can communicate with those NATs 8a, 8b using those NATs' public network addresses.

A NAT (e.g. 8a, 8b) operates as an interface between a private network (e.g. 5a, 5b) and public network (e.g. 2) by mapping the private address space of the private network into the public address space of the public network, thereby enabling nodes of the private network to communicate outside of the private network over the public network. Nodes outside of one of the private networks (5a/5b) can direct traffic intended for a particular node of that private network to the relevant NAT (8a/8b) via the public network 2 using that NATs public address, which that NAT then forwards the traffic to that node via that private network.

The operation of a NAT is described in detail below.

The private networks 5a, 5b and public network 2 and constitute a communication network 1, of which the various user devices 6a, . . . , 6'b, NATs 8a, 8b, servers 14a, 14b, and 15 and routers 3 are network nodes. The communication network 1 is also an internet (which comprises the individual networks of the public network 2 as well as the private networks 5a, 5b).

The user devices 6a, 6b run respective instances of communication client software 7a, 7b (client). The client enables the user devices 6a, 6b to establish media sessions between the user devices 6a, 6b over the network 1, for example to facilitate a real-time communication event (e.g. a voice and/or video call) between the users 4a, 4b so that the users 4a, 4b can communicate with one another over the network 1, with call audio and/or video being transmitted and received between the devices 6a, 6b in the media session. The communication is "real-time" in the sense in that there is only a short delay, for instance about 2 second or less, between audio/video being captured at a near-end device and received and outputted by the far-end device. The user devices 6'a, 6'b also run respective instances of the client software 7'a, 7'b to similar effect. The client may for example be a stand-alone application that is executed on a processor of the relevant user device, or a plugin to another application executed on the processor such as a Web browser.

Figure 2:
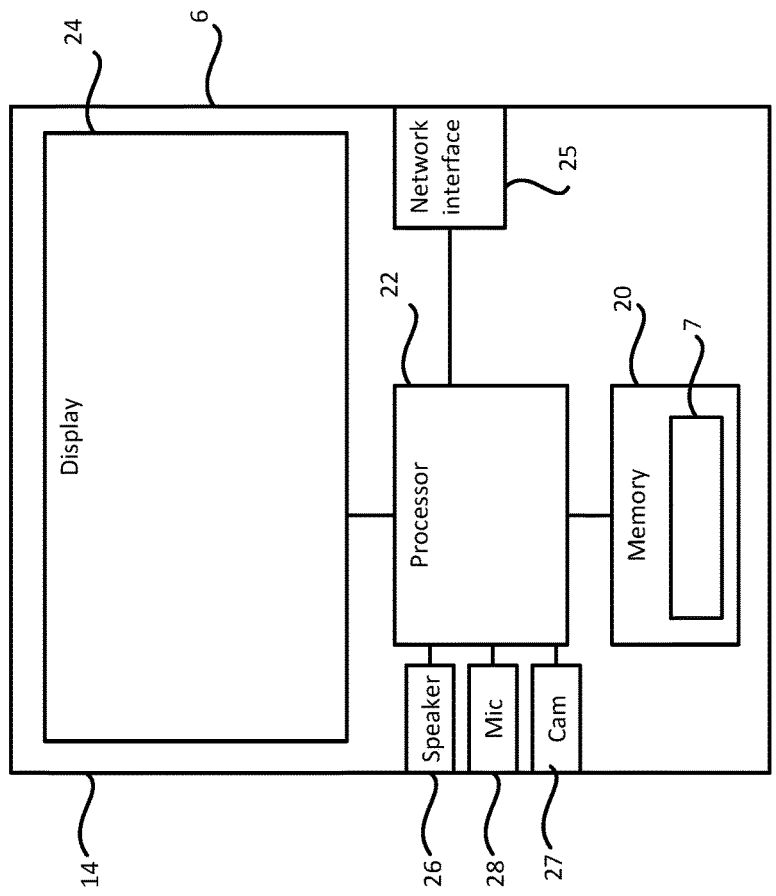
FIG. 2 shows a block diagram of a user device.

Alternatively or in addition, a user device may connect to the public network 2 by some other mechanism which does not involve any NATs though this is not shown in FIG. 2. For example, a user device may be connected via a Wi-Fi connection to a private network and to a public network via a mobile network with no NATs involved.

Figure 1A:
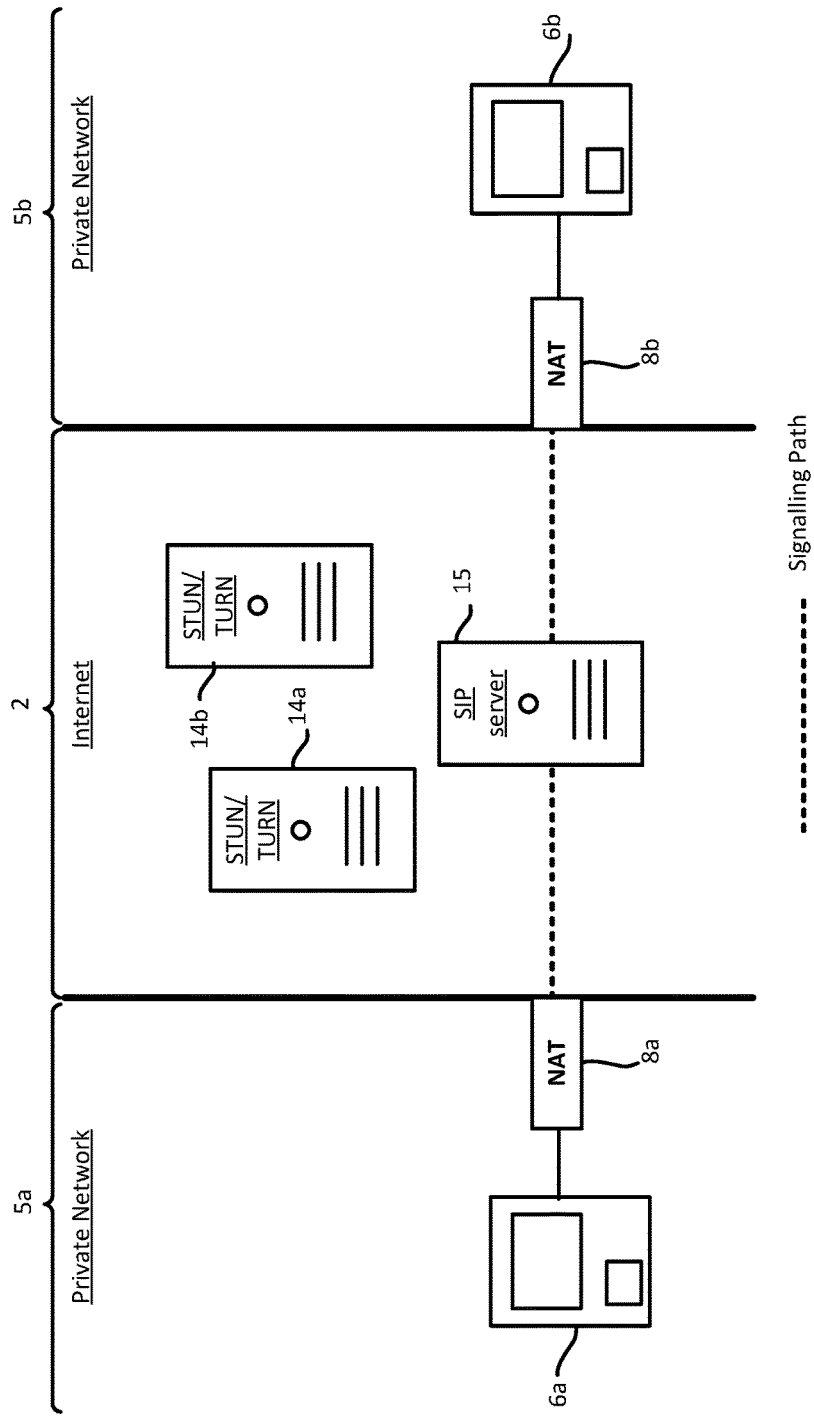
FIG. 1A shows a TURN deployment scenario.

FIG. 1A shows an exemplary signalling path (represented as a dotted line) for call signalling (not media flow). The signalling is between user devices 6a, 6b via an SIP proxy 15, and represents an exchange of SIP request-SIP response messages that results in a call or other communication event being established, terminated, modified etc. Once established, media stream(s) of the call can flow between the user devices 6a, 6b for example via one or more media relay servers 14, or "directly" via a route through the network 2 that does not involve any application layer intermediaries i.e. only lower-layer intermediaries such as routers 3 and NATs 8a, 8b.

FIG. 2 is a schematic block diagram of a user device 6 (e.g. 6a, 6b, 6'a, 6'b). The user device 6 is a computer device which can take a number of forms e.g. that of a desktop or laptop computer, mobile phone (e.g. smartphone), tablet computing device, wearable computing device, television (e.g. smart TV), set-top box, gaming console etc. The user device 6 comprises a processor 22 to which is connected memory 20, one or more output devices, such as a display 24 and loudspeaker(s) 26, one or more input devices, such as a camera 27 and microphone 28, and a network interface 25, such as an Ethernet, Wi-Fi or mobile network (e.g. 3G, LTE etc.) interface which enables the user device 6 to connect to the network 1. The display 24 may comprise a touchscreen which can receive touch input from a user of the device 6, in which case the display 24 is also an input device of the user device 6. Any of the various components shown connected to the processor may be integrated in the user device 6, or non-integrated and connected to the processor 22 via a suitable external interface (wired e.g. Ethernet, USB, FireWire etc. or wireless e.g. Wi-Fi, Bluetooth, NFC etc.). The memory 20 holds a copy of the client 7 which, when executed on the processor 22, causes the user device 6 to implement the functionality of the client 7. The client 7 has a user interface for receiving information from and outputting information to a user of the user device 6, including during a communication event such as a call.

The user interface may comprise, for example, a Graphical User Interface (GUI) which outputs information via the display 24 and/or a Natural User Interface (NUI) which enables the user to interact with a device in a "natural" manner, free from artificial constraints imposed by certain input devices such as mice, keyboards, remote controls, and the like. Examples of NUI methods include those utilizing touch sensitive displays, voice and speech recognition, intention and goal understanding, motion gesture detection using depth cameras (such as stereoscopic or time-of-flight camera systems, infrared camera systems, RGB camera systems and combinations of these), motion gesture detection using accelerometers/gyroscopes, facial recognition, 3D displays, head, eye, and gaze tracking, immersive augmented reality and virtual reality systems etc.

Figure 3:
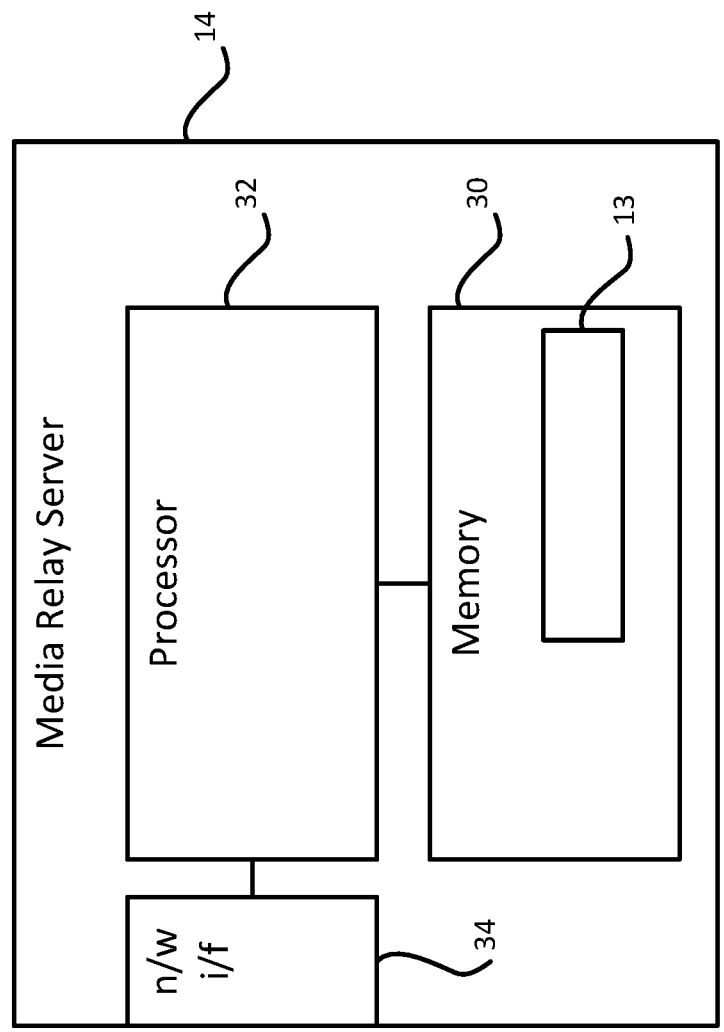
FIG. 3 shows a block diagram of a media relay server.

FIG. 3 is a schematic block diagram of a media relay server 14, which represents an implementation of the relay servers 14a, 14b in a least some implementations. The relay server 14 comprises a processor 32 to which is connected memory 30, and a network interface 34 which enables the relay server 14 to connect to the network 1. The memory 30 holds control software 13 which, when executed on the processor 32, causes the relay server 14 to implement the functionality of the control software 13. Although depicted as a single device, the functionality of the relay server 14 may be distributed across multiple devices, for example multiple server devices in a datacentre.

The network 1 has a layered architecture, whereby the functionality of the network 1 is organized into abstracted layers. This is illustrated schematically in FIG. 4. In this example, the network 1 implements the Internet protocol suite, whereby the functionality is organized into four layers 108-102: an application layer 108 (comparable to a combination of layers 5, 6 and 7 of the OSI ("Open Systems Interconnection") model), a transport layer 106 (comparable to layer 4 of the OSI model) below the application layer 108, a network layer 104 (comparable to layer 3 of the OSI model)—which is an internet layer—below the transport layer 106, and a link layer 102 (comparable to a combination of layers 1 and 2 of the OSI model) below the internet layer 104. The application layer 108 provides process-to-process communication between processes running on different hosts i.e. general purpose computer devices connected to the network 1 such as user devices 6 and servers 14a, 14b (note that routers 3 and NATs 8 are not "hosts" as the term is used herein). The transport layer 106 provides end-to-end communication between different hosts, including providing end-to-end channel(s) between hosts for use by the processes. The internet layer 104 provides routing i.e. communication between different individual networks of the internet 1, e.g. via routers 3/NATs 8 which operate at the internet layer, with the latter providing translation of network address information at the internet and transport layers (network address translation). The link layer 102 provides communication between physical network addresses—for instance, MAC ("Medium Access Control") addresses—of adjacent nodes in same individual network the internet 1 e.g. via network switches and/or hubs etc. which operate at the link layer 102.

Application layer data 17 (application data, e.g. user data) to be transmitted over the network 1 is passed at a transmitting host from the application layer 108 to the transport layer 106, at which it is packetized into transport layer packet(s) in accordance with a transport layer protocol such as UDP ("User Datagram Protocol") or TCP ("Transmission Control Protocol"). TCP is a "reliable" stream delivery service in that it involves acknowledgment/retransmission mechanisms whereas UDP is an "unreliable" stream delivery service in that it does not involve any such mechanisms. Packets of unreliable services are called datagrams. The data of the transport layer packet(s) (e.g. TCP packet(s)/UDP datagram(s)) are then passed to the internet layer 104 at that host, at which the data is further packetized into IP datagram(s) in accordance with the Internet Protocol (which is an internet layer protocol). The data of the IP datagram(s) are then passed to the link layer 102 for transmission over the network 1 to a receiving host. When received at the receiving host, the data of the IP datagram(s) is passed up to the internet layer 104, at which the data of the transport layer packet(s) is extracted from the payload(s) of the IP datagram(s) and passed up to the transport layer 106, at which the application data is extracted from the payload(s) of the transport layer packet(s) and passed up to the application layer.

Figure 4:
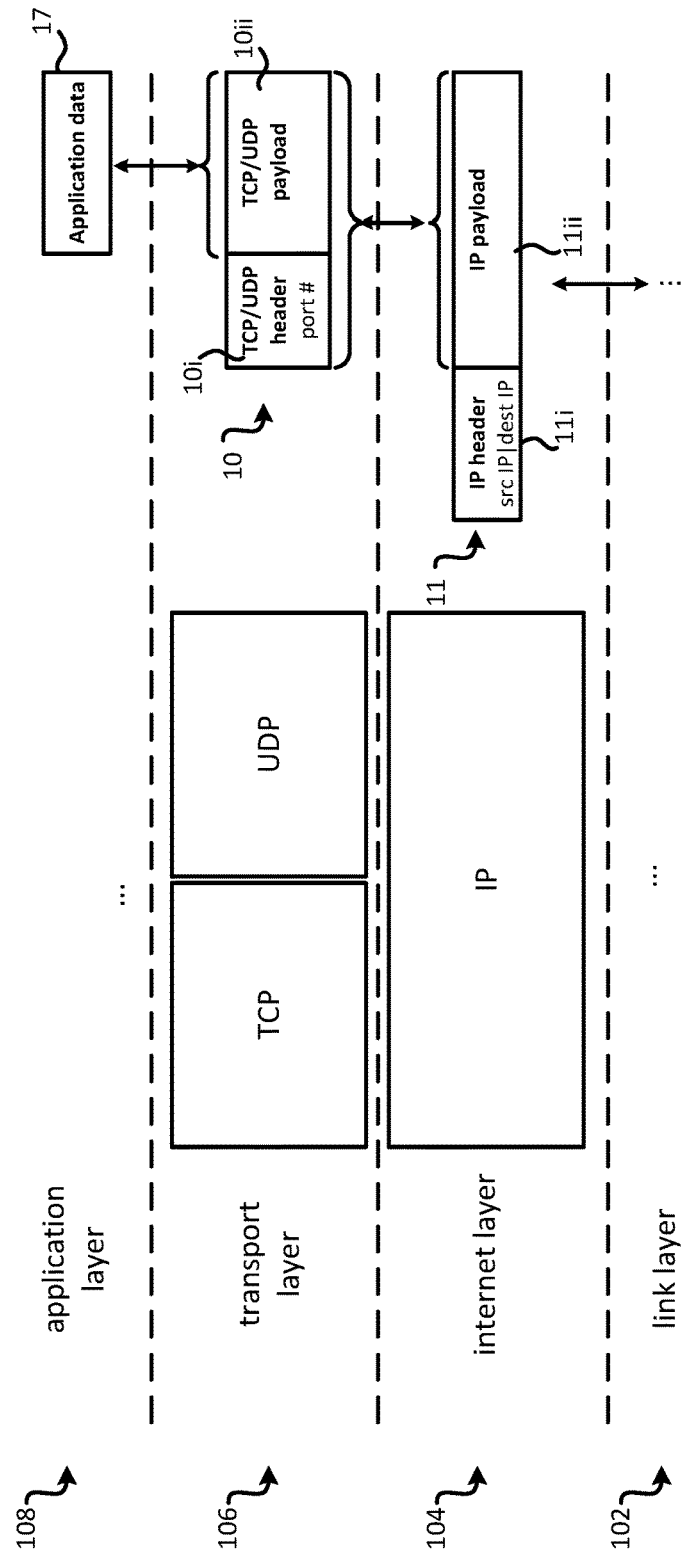
FIG. 4 shows a representation of a layered network architecture.

A transport layer packet (e.g. TCP packet or UDP datagram) 10 is illustrated in FIG. 4. The Transport layer packet 10 comprises a transport layer header (e.g. UDP/TCP header) 10i—which is generated and attached at the transport layer 106 of the transmitting host—and transport layer payload (e.g. UDP/TCP payload) 10ii—which encodes application data received from the Application layer 108.

An IP datagram 11 is also illustrated. The IP datagram 11 comprises an IP header 11i, which is generated and attached at the internet layer 104 of the transmitting host, and an IP payload 11ii, which encodes the data of the transport layer packet(s) received from the transport layer. The IP header comprises a destination transport address, which is a transport address to which the IP packet 11 is directed through the network 1, and a source transport address, which is a transport address local to the host (at least at this stage of packet generation) which generates the IP datagram.

For packets generated within a private network (e.g. 5a/5b), the IP header 11i includes a source IP address which is a private network address in the private address space of that private network (e.g. private network address of user device 6a/6b in 5a/5b). The UDP/TCP header(s) 10i contained in one or more such IP packet payloads 11i includes a port number of a port associated with that private address. The IP address and port number constitute a transport address.

As indicated, such a private address space is not useable outside of that private network. As such, were a simple router used to forward IP datagrams between that private network (e.g. 5a/5b) and a public network (e.g. 2), nodes outside of that private network would be unable to respond to such datagrams as they would not have any useable source address in the IP header.

To this end, a NAT 8 may be used to provide an interface between a public and private network.

Figure 5:
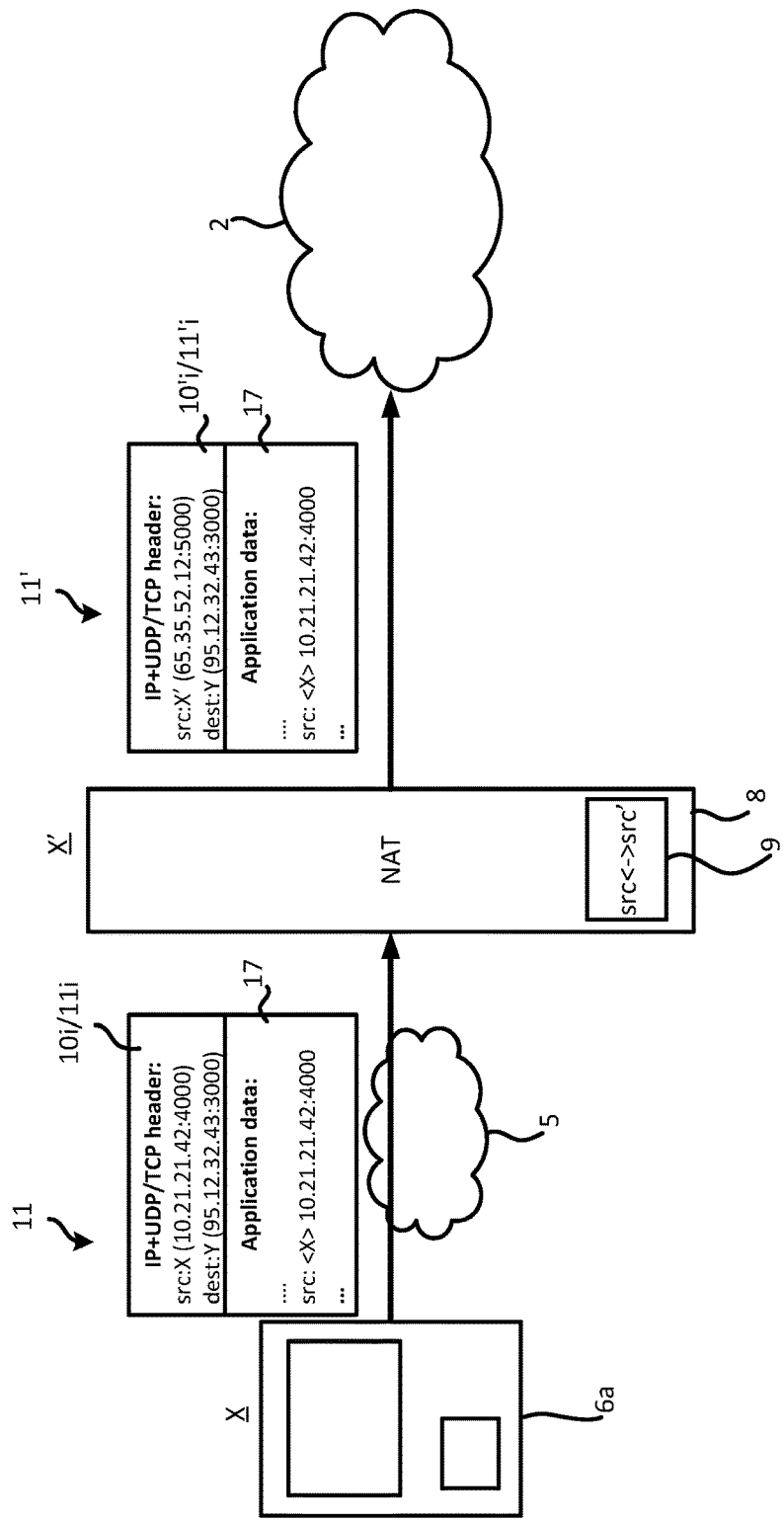
FIG. 5 illustrates operation of a Network Address Translator.

FIG. 5 illustrates the operation of a NAT 8 (e.g. 8a, 8b). IP datagrams 11 are received by the NAT via a private network 5 (e.g. 5a, 5b) from a node of that network such as a user device 6 (e.g. 6a/6'a, 6b/6'b). The IP and TCP/UDP headers 11i, 10i convey an initial source transport address of the user device 6, which comprises a private network address (which is a private IP address) of the user device 6 in the private address space of the private network 5 and a port associated with that private address. The IP and UDP/TCP headers 11i, 10i also convey a destination transport address to which the IP datagram 11 has been directed by the user device 6.

As shown, for each IP datagram, the NAT 8 modifies the IP and TCP/UDP headers 11*i*, 10*i* to replace the initial source transport address with a new source transport address, thereby generating a modified IP datagram 11' with modified IP and TCP/UDP headers 11'*i*, 10'*i* conveying the new source transport address. The destination transport address and application data 17 are unmodified by the NAT 8. The new transport address is formed by a public network address (which is a public IP address) of the NAT 8 in the public address space of the public network 2, and a port associated with that public IP address.

The NAT 8 maintains a mapping 9 between the initial transport address and the new transport address so that it can forward any return traffic that has been directed to the new transport address via the public network 2 (and which will thus end up at the NAT 8) to the initial transport address of the user device 6 via the private network 5.

In the simplest example, the NAT simply replaces the private IP address with its own public IP network address and does not alter the port. However, it is becoming increasingly common for NATs to implement address space masquerading, whereby the private address space is hidden behind a single network address. To prevent ambiguity in return packets, the NAT generally has to alter other information such as the port associated with the source address. For instance, a NAT may have a single public IP address and replace every transport address in the private address space with its own single public IP address and a unique (and likely different) port so that outside of the private network nodes of the private network are distinguished from one another only by ports associated with that single public IP address.

This is generally acceptable for protocols (such as HTTP) which simply direct responses to the source address in the IP header.

However, others protocols including some media session signalling protocols (such as SIP) also rely on address of endpoints encoded in the application data 17 itself. For example, the SIP protocol dictates that endpoints should use addresses which are contained in an SIP invite/SIP response to establish the media session, which will be encoded at the application data level. As illustrates in FIG. 5, this is not modified by the NAT 8.

Thus, for example, suppose the first user device 6*a* in FIG. 1 were to transmit application data 17 constituting a media session invite to the second user device 6*b* via the first NAT 8*a*. That NAT 8*a* would not modify the application data 17 thus, having received the invite, the second user device 6*b* would attempt to respond to the invite using the unmodified private transport of the first user device 6*a* from the unmodified application data 17—this would fail as that private address is not useable outside of the private network 5*a*, and it would therefore not be possible to establish the session. Similarly, even if the first user device 6*a* were not behind the NAT 8*a* and instead had its own public IP address, the session establishment would still fail as the second user device 6*b* is behind the NAT 5*b*: in responding to the invite with a session invite response, the second user device 6*b* would include its own private address in the second address space of the second private network 5*b* in the response encoded at the application data level, which is similarly not useable by the first user device 6*a*.

To this end, protocols such as STUN ("Session Traversal Utilities for NAT") and TURN ("Traversal Using Relay NAT") have been developed to enable SIP sessions and the like to be established between endpoints which are separated by one or more NATs.

STUN allows an endpoint to determine whether or not it is located behind a NAT and, if so, the public address of the NAT which is mapped to the private address of the initiating endpoint (i.e. effectively giving it access to the mapping 9) so that the endpoint may include that public address in the IP payload(s) rather than its own private address. Typically, STUN works by the initiating endpoint sending a query to a STUN server, which is relayed to the STUN server through the NAT and via the public network as IP datagram(s). Because the NAT replaces the private address in the IP header(s) of the query with the corresponding public address on the public side of the NAT, the STUN server can obtain the latter from the IP header(s) of the query, which it can, in turn, provide to the initiating endpoint. The initiating endpoint can then establish the session using that public address rather than its own private address, thereby conveying a useable address at the IP payload level to the responding endpoint in the session request. The responding endpoint can similarly discover its associated public address which it can convey to the initiating endpoint at the application data level in the response rather than its own private address. The role of the STUN server is effectively one of providing address discovery, and generally it does not participate in the media session once established.

As is known in the art, there are circumstances in which such a session cannot be established even when the public address of the NAT is known, for instance when the initiating and/or responding endpoint is behind a symmetric NAT. In such circumstances, one or more TURN relay servers can often be used to traverse the NAT by relaying media data through the TURN server(s).

When an endpoint needs to use a conventional TURN relay, it sends a request to the TURN relay requesting that a unique public transport address, i.e. an individual port, on the TURN relay be allocated to the endpoint. If the request is accepted, the media session is then established using that public address of the TURN server as the source address for that endpoint. That endpoint sends to the TURN server media that it wishes to transmit in the session contained in TURN messages. The TURN server extracts the media from the TURN messages, and relays it onwards from the public address on the TURN server which has been allocated to that endpoint as a source address. The TURN server also relays data intended for that endpoint which has been directed to the address allocated on the TURN server to that endpoint contained in TURN messages for extraction by that endpoint.

If both endpoints are located behind NATs that do not permit STUN, then each will need its own respective transport address to be allocated on a TURN server, in which case the media session is established between those two allocated TURN server addresses and each endpoint relays/receives data in TURN messages, with data provided to the TURN servers being transmitted and received to/from the two TURN server addresses allocated to those endpoints in the media session.

TURN relaying requires resources—including the unique public transport address(es) allocated on the TURN server(s)—to be allocated on that (those) server(s) for at least the duration that media session, and also means that media of the media session travels via a less direct path than when a media session is established directly between the endpoints or via one or more NATs. Though it does require additional resources, TURN relaying can more or less guarantee to provide a useable path through a network for a media session.

STUN and TURN functionality can be incorporated in the same server, which is sometimes referred to as a TURN/STUN server or simply as a TURN server even though it also includes STUN functionality.

The media servers 14 of FIG. 1 are TURN servers, which incorporate at least TURN functionality and thus have both address lookup and media relay functionality. Alternatively, this and/or other functionality may be split between separate servers, or the functions performed by the media servers 14a, 14b described below may be performed by the same server.

ICE ("Interactive Connectivity Establishment") is a known protocol that is used for establishing connectivity for VoIP sessions traversing network address NATs and firewalls, which attempts to establish the most efficient path in terms of media latency to ensure ideal media quality. Details of the ICE protocol can be found in the publically available RFC 5245, Interactive Connectivity Establishment (ICE): A Protocol for Network Address Translator (NAT) Traversal for Offer/Answer Protocols, J. Rosenberg (April 2010). Certain extensions to the ICE protocol are defined in [MS-ICE2] Interactive Connectivity Establishment (ICE) Extensions documentation (http://msdn.microsoft.com/en-us/library/office/cc431504 (v=office.12).aspx).

In the context of ICE, a direct path, i.e. not involving any TURN relaying, between clients is preferred for a media session over an indirect path e.g. that involves using intermediate relay servers (e.g. relaying through TURN server(s)). A path is identified by a pair of transport addresses—one of which is used to transmit and receive data by an initiating endpoint and the other to transmit and receive data by a responding endpoint.

The ICE protocol attempts to identify what it deems to be the most efficient path based on static priorities, which are assigned to each of a number of so-called "candidate pairs" that could be used for the media session. A candidate is a transport address associated either an initiating endpoint or a responding endpoint. A candidate pair is a pair of candidates (i,r), the first (i) associated with (i.e. available to) the initiating endpoint and the second (r) with the responding endpoint. The term "candidate" relates to the fact that the ICE mechanism initially assumes that any transport address associated with an endpoint might be useable for a media session (though it may not actually be useable for reasons discussed above)—the ICE protocol then involves detecting which of the identifying candidate(s) are actually useable.

ICE classes candidates into 3 categories: host candidates, reflexive candidates and relayed candidates.

A host candidate is a transport address which is local to the endpoint in question i.e. on a network interface directly attached to the endpoint. For example, the private addresses of the user devices 6a, 6b are local to those user devices and are thus host candidates, and similarly if the user devices were directly connected to the public network 2 (rather than or in addition to via the NATS 8a, 8b) they would have their own public addresses local to those user devices which would also be host addresses.

A reflexive candidate is a transport address which is not local to an endpoint, but which is a translated transport address on the public side of a NAT (e.g. as included in the modified IP header 11'i of FIG. 5). These are classed into two sub categories: "server reflexive candidates" which are public NAT addresses discovered by querying a server e.g. STUN server in the manner outlined above, and "peer reflexive candidates" which are discovered by the other endpoint during the establishment of the media session (e.g. a public side NAT address associated with the initiating endpoint as discovered by the responding endpoint, or vice versa).

A relayed candidate is a transport addresses allocated from a media relay server e.g. TURN server in the manner outlined above.

Potentially, any of the initiating endpoint's candidate transport addresses can be used to communicate with any of the responding endpoint's candidate transport addresses. That is, the first user device 6a can potentially direct data from any of its own associated addresses to any of the addresses associated with the second user device and vice versa.

However, in practice, some candidate pairs will not be valid (i.e. will not work). For instance, if the endpoints are both behind NATs and their host candidates are private addresses in the private networks 5a/5b, they are unlikely to be able to communicate directly using those addresses for the reasons discussed above. However, if their host candidates are public addresses which, when used, do not involve routing data through any NATs then the candidate pair may well be valid. Similarly depending on the type of NATs (e.g. if it is a symmetric NAT), use of reflexive candidates may not be possible as discussed.

Each candidate pair thus potentially represents a path through the network of a certain type, although such a path will only be available in practice if the candidate pair is actually valid.

The order in which candidate pairs are tried is dictated by the ICE static priority scheme, with higher priority pairs being tried ahead of lower priority pairs.

In accordance with the ICE protocol, each candidate can be assigned a static priority in accordance with equation 1:

$$\text{priority} = (2^{24})*(\text{type preference}) + (2^{8})*(\text{local preference})$$

1. $+(2^{0})*(256-\text{component ID})$

The type preference is an integer from 0 to 126 inclusive, and represents the preference for the type of the candidate (local, server reflexive, peer reflexive, and relayed). 126 is the highest preference, and a 0 is the lowest. Setting the value to a 0 means that candidates of this type will only be used as a last resort. The type preference is identical for all candidates of the same type and is different for candidates of different types. The type preference for peer reflexive candidates is higher than that of server reflexive candidates. The ICE protocol recommends values of 126 for host candidates (unless these are from a Virtual Private Network interface, in which case 0 is recommended), 100 for server reflexive candidates, 110 for peer reflexive candidates, and 0 for relayed candidates. The local preference is an integer from 0 to 65535 inclusive and represents a preference for the particular IP address from which the candidate was obtained when an endpoint is multihomed (connected to more than one computer network). When there is only a single IP address, ICE recommends setting this to the maximum of 65535, effectively making this term redundant when there is no multihoming. The component ID term is an identifier of the candidate. As can be seen, by far the most significant term in equation 1 is the first term which is based on the candidate type. Thus the ICE priority scheme deprioritizes indirect paths via relayed candidates, which it uses only as a last resort, and moreover biases the static priorities away from reflexive candidates. Once the candidate pairs are formed and priorities assigned in accordance with equation (1), candidate pair static priorities for each candidate pair can be calculated in accordance with equation 2:

$$\text{pair priority} = 2^{32}*\text{MIN}(G,D) + 2*\text{MAX}(G,D) + (G>D?1:0)$$

where G is the static priority for the initiating endpoint's candidate, D that for the responding endpoint's candidate, and G>D?1:0 an expression whose value is 1 if G is greater than D, and 0 otherwise.

The lowest priority path is the TURN-TURN path, i.e. corresponding to the TURN-TURN candidate pair, in which both network addresses are TURN serer addresses such that media data is relayed via one or more TURN servers in both directions. Thus, in conventional ICE, this is checked only when all other candidate pairs have been checked and determined to be invalid, and is therefore used only as a last resort when all other options have been definitively exhausted.

To summarize, the ICE can be used to establish media flow between a callee endpoint and a caller endpoint. In typical deployments, a network address translation (NAT) device or firewall might exist between the two endpoints. NATs and firewalls are deployed to provide private address space and to secure the private networks to which the endpoints. If the endpoint advertises its local interface address, the remote endpoint might not be able to reach it. Moreover, NATs and firewalls exhibit differing behaviour in the way they create the NAT-mapped addresses. ICE provides a generic mechanism to assist media in traversing NATs and firewalls without requiring the endpoints to be aware of their network topologies. ICE assists media in traversing NATs and firewalls by gathering one or more transport addresses, which the two endpoints can potentially use to communicate, and then determining which transport address is best for both endpoints to use to establish a media session.

Existing ICE Protocol:

In order to provide context, a conventional ICE signalling procedure will now be described with reference to FIG. 6.

Figure 6:
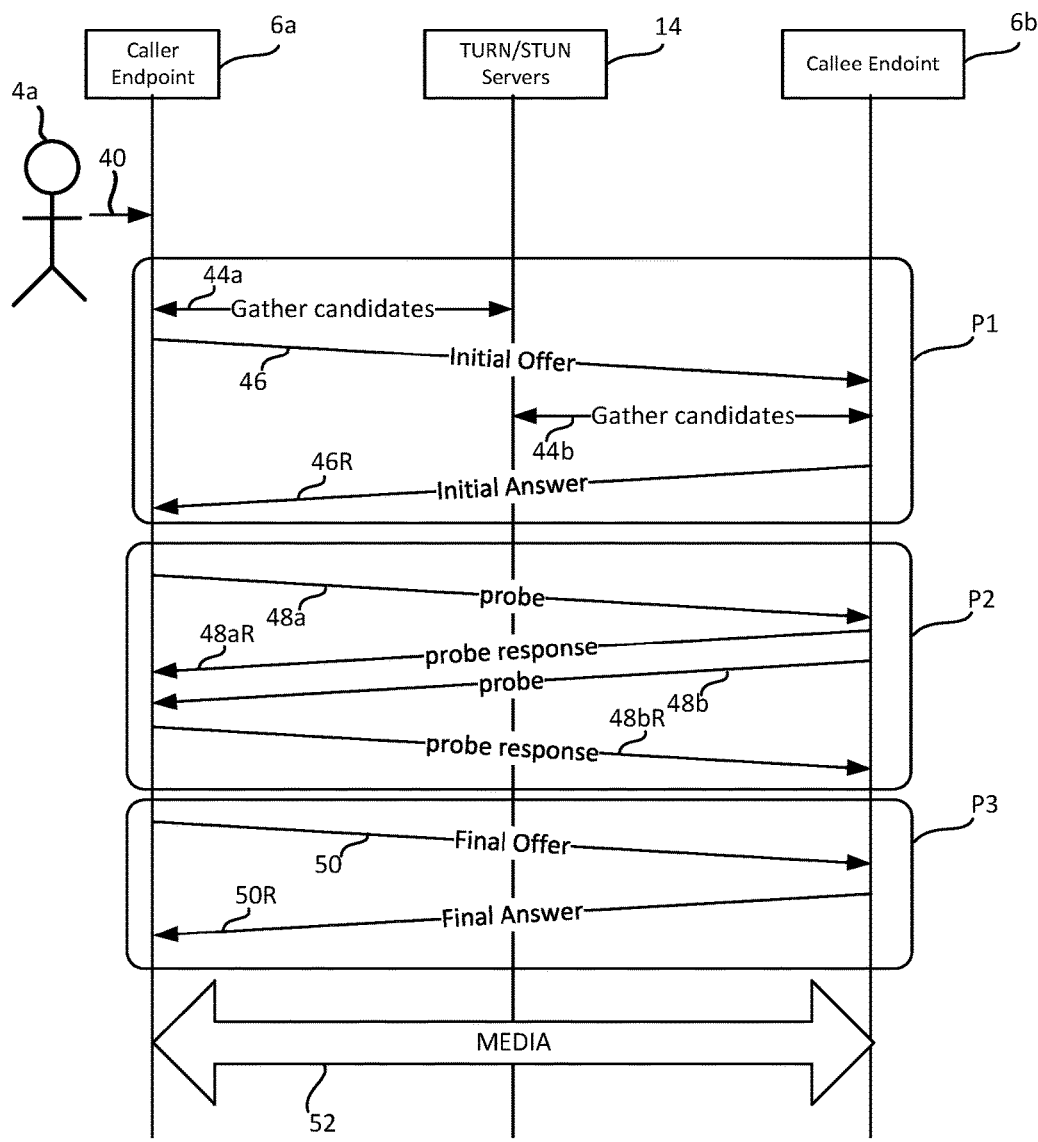
FIG. 6 shows a signalling diagram for a conventional ICE signalling flow.

FIG. 6 shows a sequence diagram that outlines the various phases involved in establishing a session between two endpoints, a caller 6a and callee 6b (which represents instances of the user devices 6a, 6b), using ICE. These phases are:

Candidates gathering and the exchange of gathered transport addresses between the caller and callee endpoints (P1);

Connectivity checks (P2);

The exchange of final candidates selected by the connectivity checks (P3).

During the candidate gathering phase P1, endpoints gather potential candidates for connectivity. This includes host candidates (bound to local interface), server reflexive candidates (NAT mapping discovered using TURN server 14, using the STUN protocol), and relayed candidates (forwarding port allocated on the TURN 14, aka in its role of media relay server). The server reflexive and relayed candidates are discovered by exchanging gathering messages 44a between the initiating endpoint 6a and one of the TURN servers 14. The candidate gather phase P1 is instigated in response to a session instigation instruction 40 at the initiating device 6a, which is received from the user 4a in this example but could alternatively be generated automatically, e.g. at a predetermined time.

The candidates gathered by the callee 6a are sent to the caller 6b in an initial offer message 46 via the network 2. The offer can be encoded into an SDP offer and exchanged over a signalling protocol such as SIP. The caller endpoint 6a serves as a controlling agent and is responsible for selecting the final candidates for media flow. The callee 6b, in response to receiving the offer 46, follows the same procedure to gather its candidates, by exchanging candidate gathering messages 44b with one of the TURN servers 14 (this can be the same TURN server or a different TURN server to that used by callee 6a). The candidates it gathers are encoded and sent to the caller in an initial answer message 46R via the network 2. With the exchange of candidates complete, each endpoints 6a, 6b is now aware of its peer's (i.e. the other endpoint's) candidates.

At the initiating endpoint 6a, the session instigation instruction 40 constitutes a session instigation signal. At the responding endpoint 6b, it is the offer 46 from the initiating endpoint 6a that constitutes a session instigation signal.

To ensure each endpoint can receive the other's candidates, the candidates can for example be transmitted via one of more proxy servers 15, such as SIP server(s), though this is not shown in FIG. 6.

During the connectivity checks phase P2, both endpoints 6a, 6b pair up the local candidates and remote candidates to form a so-called "check list" of candidate pairs that are ordered based on the priorities of the candidate pairs, and systematically perform connectivity checks using STUN binding request response exchanges.

This involves the caller 6a and the callee 6b attempting to exchange probe data for each candidate pair in the following manner. For each candidate pair, each of the endpoints 6a, 6b transmits to the other endpoint a probe message 48a, 48b (which are STUN binding requests). Each probe message 48a, 48b is transmitted to the transport address in that candidate pair of the other endpoint, and indicates in its body the transport address in that candidate pair of the transmitting endpoint, i.e. within the application layer data 17 of the probe message such that it is unaffected by any modification to the IP or transport header 10i/11i by any NAT 8a, 8b that the probe message passes though in transit (if this differs from the transport address denoted in the IP and transport headers, the receiving endpoint can deduce that the probe message has indeed passed through a NAT, and can also determine the transmitting endpoint's public transport address on that NAT. This is a means by which peer reflexive candidates can be discovered during the connectivity checks P2, as is known in the art). If and when this message is successfully received by the other endpoint, it transmits a response 48aR, 48bR (STUN binding response) to the transport address indicated in the body of the probe message. If and when the response is received by the endpoint that transmitted the request 48a, 48b, that endpoint determined that candidate pair to be valid. For each candidate pair, in some cases, the endpoint may attempt to send multiple probe messages up to a retry threshold after a suitable timeout if no response is received, before finally determining the candidate pair to be invalid once the retry threshold has been reached.

The ordering of the connectivity checks ordering based on ICE priorities ensures that TURN relaying is only used as a last resort in conventional ICE, if and only if all other types of path fail.

At the end of the connectivity checks the caller 6a selects (in phase P3) the best candidate pair to be used for media flow and all other candidates are discarded. The caller 6a communicates the selected candidate pair to the callee 6b in a final offer message 50, and the callee confirms the selection with a final response 50R.

Once this final answer-offer exchange 50, 50R has been completed, a media session 52 is established using the selected candidate pair, such that media data of the media session is transmitted between the endpoints 6a, 6b using the transport addresses of that candidate pair. Depending on what candidate pair is selected, the media data may be transmitted directly between respective host addresses of the endpoints (generally only possible if the endpoints are not behind NATs 8a, 8b, or if they happen to be behind the same NAT such that their host addresses are addressable to each other), or through a NAT 8a, 8b in one or both direction (where one or both of the candidates of the selected pair is a reflexive address, such that media data is transmitted to that address on the public side of the NAT) and/or via a TURN server or servers 14 in one or both directions (where one or both of the candidates of the selected pair is a relayed candidate) only as a last resort.

The Traversal Using Relay NAT (TURN) protocol used by ICE enables a TURN client located on a private network behind one or more network address translation (NAT) to allocate a transport address from a TURN server that is sitting on the Internet 2. This allocated transport address can be used for receiving data from a peer. The TURN protocol also enables the client to discover its external NAT mapping.

Modified ICE Protocol

As indicated above, the connectivity checks P2 have a duration that increases significantly when bandwidth is particularly constrained for at least one of the endpoints 6a, 6b. For example, where one or both endpoints 6a, 6b are connected to networks 5a, 5b respectively by a low bandwidth network connection, such as a weak cellular, Wi-Fi or other wireless connection. Following the conventional ICE signalling flow of FIG. 6, this in turn can significantly increase the call setup time i.e. the duration from the time at which the media session instigation instruction 40 is received and the time at which the media session 52 is finally established.

To address this issue, example modifications of the ICE signalling flow in accordance with various embodiments of the present invention are described below. The alternative signalling flows described below are the same as FIG. 6 unless otherwise indicated, and like reference signs denote equivalent features. Thus all description pertaining to the signalling flow of FIG. 6 applies equally to the alternative signalling flows described below, unless otherwise indicated.

First Example

Figure 7:
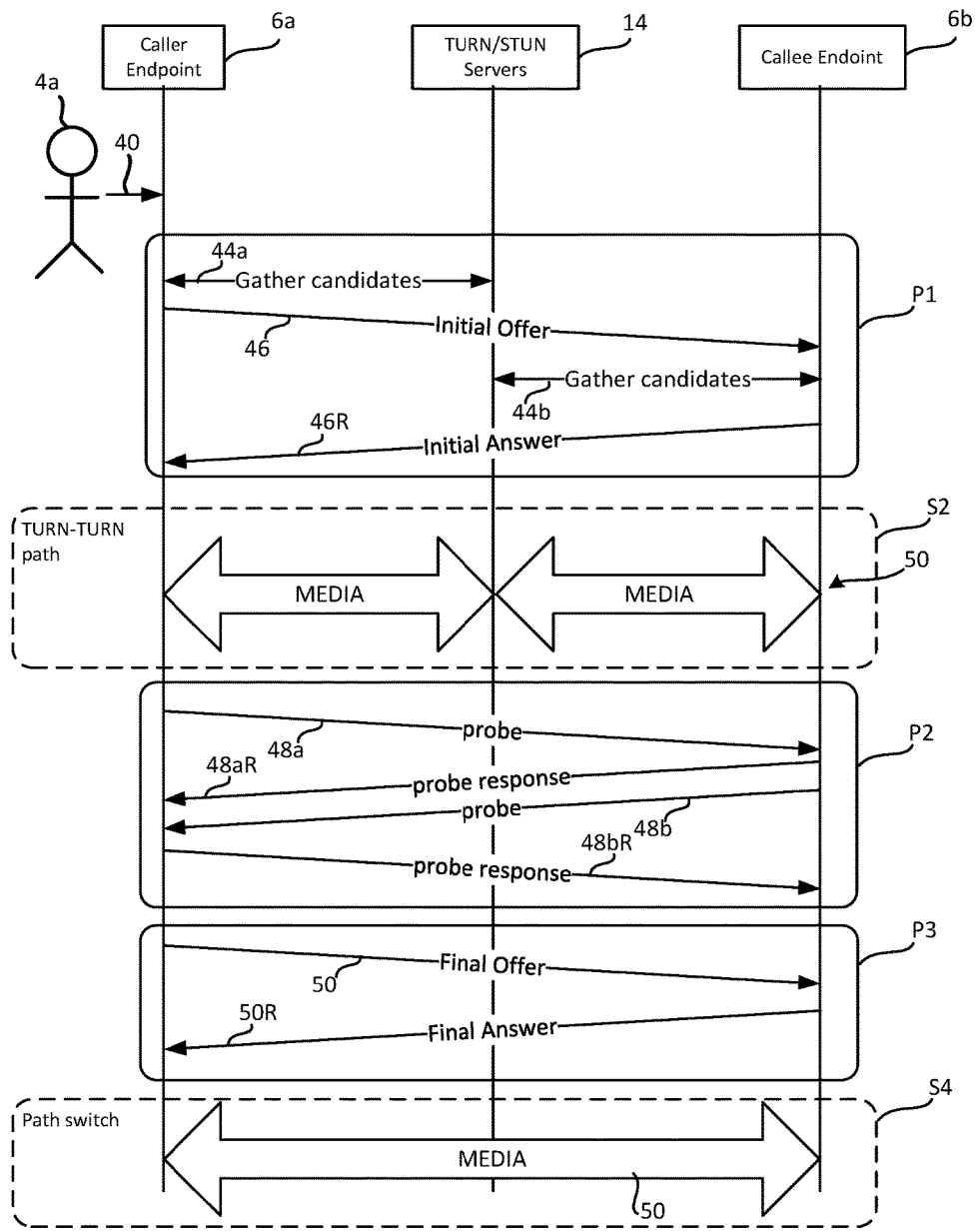
FIG. 7 shows a signalling diagram for an alternative process of establishing a media session in a first example embodiment of the present invention.

FIG. 7 shows a first example of an alternative signalling flow. As in FIG. 6, the candidate gathering phase P1 is instigated in response to the session instigation instruction 40, received for example from the user 4a or automatically generated. The gathering phase P1 proceeds in the same way as FIG. 6.

However, after the gathering phase P1 has been completed by the exchange 48a, 48b of candidates and the generation of the candidate pair check list at each endpoint 6a, 6b, the media session 50 is established immediately, at step S2, using the TURN-TURN candidate pair determined in phase P1. That is, the media session 50 is established initial at step S2 such that media data of the established media session is relayed via one or more media relay servers 14 in both directions (i.e. from caller 6a to callee 6b via at least one TURN server, and from callee 6b to caller 6a via at least one TURN server 14, which can be the same TURN server or a different TURN server).

No connectivity check is performed for TURN-TURN candidate pair, which the present disclosure recognizes is viable because in practice this is guaranteed to work (to all intents and purposes).

The connectivity checks P2 are performed for the remaining candidate pairs in parallel. That is, the connectivity checks P2 may begin before or after the media session 50 has been successfully established at step S2, but in any event the media session 50 is established at step S2 using the TURN-TURN path independently of the connectivity checks P2 and before they have been completed.

As will be apparent, this is very different to conventional ICE, in which the TURN-TURN pair has the lowest priority and is therefore checked only after all other candidate pairs have been checked and is used only as a last resort at the end of the connectivity checks P2.

Once the candidate checks P2 for the remaining candidate pairs have been completed, assuming at least one of the remaining candidate pairs is determined to be valid in the connectivity checks P2, that candidate pair is selected by the caller 6a, and communicated to and acknowledged by the callee 6b in the final offer answer exchange 50, 50R of phase P3 as above—the difference being that, by this point, the media session 50 has already been established, and initial media data thereof, has already flowed between the endpoints 6a, 6b via the TURN-TURN path.

With this final exchange 50, 50R completed, the endpoints then switch the media session to the candidate pair selected and acknowledged in phase P3, so that subsequent media data of the media session 50 is transmitted thereafter using that candidate pair instead. That is, via the network path defined by that candidate pair.

Second Example (MTURN)

Figure 8:
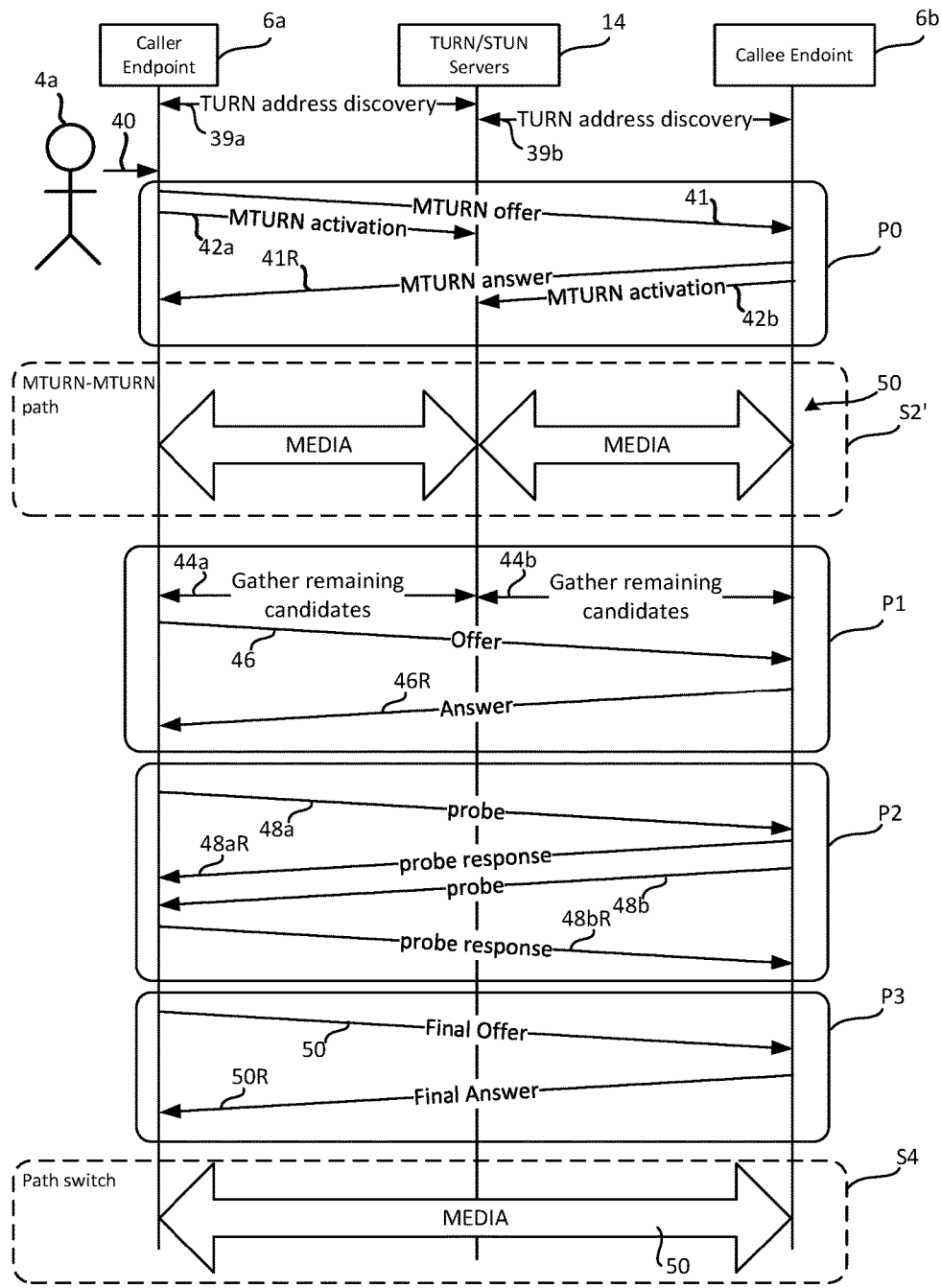
FIG. 8 shows a signalling diagram for an alternative process of establishing a media session in a second example embodiment of the present invention.

The second example of FIG. 8 is based on a technology referred to herein as MTURN (Multiplexed TURN). The MTURN technology is described in the Applicant's co-pending U.S. patent application Ser. Nos. 14/750,802, 14/750,787 and 15/061,485, each of which is incorporated herein by reference in its entirety.

As described in detail the aforementioned, in MTURN, unique session identifiers (IDs), also referred to as multiplexing IDs or MTURN IDs, are assigned to endpoints, which are then used to multiplex media streams from different endpoints over the same port of a TURN server. An MTURN candidate is a TURN candidate (media relay IP+port) plus the session identifier used to multiplex over that port at the TURN server.

The session ID can be issued to an endpoint, or even generated by the endpoint itself (e.g. as a globally unique identifier), without requiring the endpoint to be authenticated to the TURN server in question. The TURN server will not allow the MTURN candidate to be used (i.e. it will refuse to relay any media data it receives for that MTURN candidate) until the endpoint has activated it by authenticating itself to the TURN server. However, when the endpoint wishes to send an MTURN candidate to another endpoint in the candidate exchange phase P1, it can do so immediately, and can activate the MTURN candidate in parallel. This is made viable by the use of session identifiers—without these, this would require individual ports at the TURN server to be reserved, which is problematic as they are a finite resource and because of the related security issues.

In MTURN, the media relay server 14 has access to a port multiplexing database associated with the port over which multiplexing is to be performed. The server receives multiple allocation requests from the network, each allocation request indicating (e.g. comprising or otherwise making available to the media relay server) a different endpoint network address, and store each endpoint network address in association with a unique session identifier (ID)—for example having a size of 64-bits or more—in the database.

The network address may, for example, be a network address that is local to a network interface of a network endpoint (e.g. user device), a network address on the public side of a NAT to which the network endpoint is connected, or even a network address on another media relay server which has allocated resources for use by the network endpoint (so that media is relayed via multiple relay servers) etc. An input of the media relay server is configured to receive multiple media streams from the network via the port simultaneously, each stream being directed to the server network address and indicating (e.g. comprising or otherwise making available to the media relay server) the port identifier and a separate target session identifier i.e. separate from the port identifier. For each stream, the server 14: determines the endpoint network address associated in the database with the target session identifier indicated by that stream, and transmits that stream to that endpoint network address. In this manner, multiple media streams are relayed to different network endpoints via the same port simultaneously. This is in contrast to existing TURN servers which allocate an individual port to each network endpoint i.e. so that a given port only relays a media stream to a single network endpoint at a time.

This is exploited in the second example flow of FIG. 8. In this example, in response to the session instigation instruction 40, a new provisional candidate exchange phase P0 is instigated, in which the caller endpoint immediately transmits a message 41 indicating its MTURN candidate to the callee endpoint 6b (MTURN offer), which it activates in parallel by sending at least one authentication message 42a comprising the session ID to TURN server 14. "In parallel" in this context means the MTURN offer 41 is transmitted independently of any response to the authentication message 42a from the TURN server and before any such response is received at the caller endpoint 6a. The callee endpoint immediately responds within a response 41R (MTURN response) indicating its own MTURN candidate, which it activates in parallel via authentication message(s) 42b in the same way.

Accordingly, in this provisional phase P0, the candidates can very quickly discover each other's MTURN candidates, allowing the media session 50 to be established very quickly at step S2 using the resulting MTURN-MTURN candidate pair. This reduces the call set up further, and neither endpoint 6a, 6b need to communicate with the TURN server(s) 14 before sending the MTURN offer/answer 41, 41R.

Again, no connectivity check for the MTURN-MTURN path is performed because it is unnecessary—this is all but guaranteed to work in practice.

In this scenario, the endpoints 6a, 6b can discover the transport addresses of their respective TURN server 14 before the session instigation input 40 is received (even though they are unable to use them at this point, prior to MTURN activation), in respective message exchanges 39a, 39b with the TURN server. The session IDs can also be determined at part of this, for example they may be allocated by the TURN server. Alternatively, these can be determined later, for example by the endpoints themselves each randomly selecting a globally unique session ID as and when it is needed for the MTURN offer 41 and MTURN answer 41R.

The conventional candidate gathering phase P1 to discover the remaining candidates, and subsequent connectivity checks P2 for those candidates, can then proceed. However, these do not delay the establishment of the media session 50 via the MTURN-MTURN path, and the media session can be established before even the candidate gathering phase P1 has been completed. As in the example of FIG. 7, if at least one alternative candidate pair is determined to be valid in the connectivity checks P2, in phase P3 the endpoints 6a, 6b agree to switch to this alternative candidate, resulting in the media session 50 being switched to this candidate at step S4.

Conditional Implementation:

In some cases, the present techniques whereby the TURN-TURN path is used initially by default unchecked, may only be used when the endpoints 6a, 6b have severely constrained bandwidth (i.e. below a bandwidth threshold). For example, where one or both endpoints are connected to the network 5a/5b via a network connection having particularly constrained bandwidth (e.g. weak cellular, Wi-Fi or other wireless connection).

In this case, the endpoints 6a, 6b detect a constrained bandwidth condition, which causes them to implement the above steps such that the TURN-TURN path is used immediately at the start of the media session unchecked.

For example, one of the endpoints may detect that it has a weak connection, and communicate this to the other endpoint. In this manner, the endpoints 6a, 6b can agree to use the TURN-TURN path immediately without checking it first.

In this case, the available bandwidth for the connectivity checks may be limited, for example constrained such that the probe data consumes no more than a predetermined bandwidth cap (e.g. no more than 5 kbps), to ensure sufficient bandwidth is available for the initial media data of the established media session. For example, more bandwidth may be reserved for the media data than the probe data, such that the media data can be transmitted at a higher data rate (e.g. >5 kbps).

If connectivity checks were to use excessive bandwidth on a constrained link (connection) this could result in failure to establish connectivity or severely impact quality of media session. The pacing of connectivity checks to adhere to a bandwidth limit (cap) thus not only increases the likelihood of the call being established successfully, but does so without impacting quality of media that could be flowing at that point.

Pacing of connectivity checks to adhere to a bandwidth limit can result in connectivity checks taking a long time to find a better (that is, less expensive) path. However, this is prevented from impacting the user experience, by allowing media to flow on the TURN-TURN path before connectivity checks establishment process completes. The call can thus be established in a timely fashion, with an acceptable media quality that is not excessively impacted by the connectivity checks.

In some implementations, a client 7a, 7b can determine, or at least obtain an indication of, its available bandwidth during the allocation procedure. That is, the part of the candidate gathering process processes in which the TURN or MTURN candidate is allocated to it. For example, the client 7a, 7b can determine this bandwidth as an estimate based on a measured round-trip time (RTT) between the client and the TURN server 14 and/or based on a number of retries during the allocation process (that is, a number of requests the client has sent to obtain its (M)TURN candidate). A high RTT indicates potentially constrained bandwidth, as does a high number or retries.

Note that in practice it may be difficult for the clients to obtain an accurate bandwidth estimate. However, a high RTT and/or high number of retries can be used as a proximation for congestion detection or poor network detection. That is, a high RTT and/or the fact that a response is only received from the TURN server 14 candidate after a high number retries when obtaining the TURN can be used as an indication of congestion or poor network (i.e. constrained bandwidth), and in some cases the TURN-TURN only logic may only be triggered under such conditions.

In the above, the signalling flows of FIGS. 7 and 8 are implemented by the clients 7a and 7b executed on the respective processors of endpoints 6a, 6b. The TURN server functionality is implemented by the code 13 when executed on the (respective) processor(s) of the TURN server(s) 14.

Generally, any of the functions described herein can be implemented using software, firmware, hardware (e.g., fixed logic circuitry), or a combination of these implementations. The terms "module," "functionality," "component" and "logic" as used herein generally represent software, firmware, hardware, or a combination thereof. In the case of a software implementation, the module, functionality, or logic represents program code that performs specified tasks when executed on a processor (e.g. CPU or CPUs). The program code can be stored in one or more computer readable memory devices. The features of the techniques described below are platform-independent, meaning that the techniques may be implemented on a variety of commercial computing platforms having a variety of processors.

For example, the user devices (user terminals) may also include an entity (e.g. software) that causes hardware of the user terminals to perform operations, e.g., processors functional blocks, and so on. For example, the user terminals may include a computer-readable medium that may be configured to maintain instructions that cause the user terminals, and more particularly the operating system and associated hardware of the user terminals to perform operations. Thus, the instructions function to configure the operating system and associated hardware to perform the operations and in this way result in transformation of the operating system and associated hardware to perform functions. The instructions may be provided by the computer-readable medium to the user terminals through a variety of different configurations. One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RANI), read-only memory (ROM), an optical disc, flash memory, hard disk memory, and other memory devices that may us magnetic, optical, and other techniques to store instructions and other data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

For example, although embodiments of the present invention have been described in the context of the ICE/TURN/STUN protocols, the invention is not limited to this and can be implemented in other contexts.

The invention claimed is:

1. A method of establishing a media session between a first device and a second device, the method comprising implementing at the first device the following steps:

determining at the first device, by exchanging network addresses between the devices: (i) a relayed-relayed candidate pair comprising a first media relay server network address available to the first device and a second media relay server network address available to the second device, and (ii) at least one alternative candidate pair comprising a first network address available to the first device and a second network address available to the second device, wherein at least one of those network addresses is a host or reflexive address; and in response to a session instigation signal at the first device: establishing a media session between the devices using the relayed-relayed candidate pair, and performing connectivity checks for at least the alternative candidate pair to determine whether or not the alternative candidate pair is valid;

wherein the media session is established using the relayed-relayed candidate pair without any connectivity checks having been performed by the devices for the relayed-relayed candidate pair and before the connectivity checks for the alternative candidate pair have been completed; and wherein if the alternative candidate pair is determined to be valid in the connectivity checks, the established media session is switched to the alternative candidate pair in response.

2. A method according to claim 1, wherein initial media data of the established media session and probe data of the connectivity checks are transmitted and received between the devices via at least one shared connection, and the steps further comprise detecting at the first device a condition of constrained bandwidth for the shared connection.

3. A method according to claim 2, wherein said establishment of the media session using the relayed-relayed candidate pair is performed in response to said detection of the constrained bandwidth condition.

4. A method according to claim 2, wherein the probe data is transmitted and received between the devices in the connectivity checks at a data rate that is restricted to account for the constrained bandwidth condition.

5. A method according to claim 4, wherein the probe data is transmitted and received between the devices at a lower data rate than the initial media data.

6. A method according to claim 4, wherein the probe data is transmitted and received within a predetermined bandwidth cap.

7. A method according to claim 2, wherein the shared connection is a local network connection between the first device and a network, wherein the constrained bandwidth condition is detected at the first device by determining an available bandwidth of the local network connection and comparing it with a bandwidth threshold.

8. A method according to claim 2, wherein the shared connection is a remote network connection between the second device and a network, and the constrained bandwidth condition is detected at the first device by receiving at the first device from the second device a message indicating the constrained bandwidth condition.

9. A method according to claim 2, wherein the condition of constrained bandwidth is detected based on an exchange of messages between the first device and a server that is performed to obtain, at the first device, the first media relay server network address.

10. A method according to claim 9, wherein the condition of constrained bandwidth is detected based on a round-trip time of the message exchange and/or a number of retries for the message exchange.

11. A method according to claim 1, wherein the relayed-relayed candidate pair and the alternative candidate pair are determined at the first device in a candidate gathering phase instigated in response to the session instigation signal.

12. A method according to claim 1, wherein the first media relay server network address is determined by the first device before the session instigation signal is received.

13. A method according to claim 12, wherein the alternative candidate pair is determined at the first device in a candidate gathering phase instigated in response to the session instigation signal, wherein the media session is established using the relayed-relayed candidate pair before the candidate gathering phase has been completed.

14. A method according to claim 12, wherein the relayed-relayed candidate pair further comprises a first multiplexing identifier for multiplexing over the first media relay server network address and a second multiplexing identifier for multiplexing over the second media relay server network address.

15. A computer program product comprising code stored on a computer-readable storage medium and configured, when executed on a processor of a first device, to establish a media session between the first device and a second device by implementing the following steps:
  determining at the first device, by exchanging network addresses between the devices: (i) a relayed-relayed candidate pair comprising a first media relay server network address available to the first device and a second media relay server network address available to the second device, and (ii) at least one alternative candidate pair comprising a first network address available to the first device and a second network address available to the second device, wherein at least one of those network addresses is a host or reflexive address; and
  in response to a session instigation signal at the first device: establishing a media session between the devices using the relayed-relayed candidate pair, and performing connectivity checks for at least the alternative candidate pair to determine whether or not the alternative candidate pair is valid;
  wherein the media session is established using the relayed-relayed candidate pair without any connectivity checks having been performed by the devices for the relayed-relayed candidate pair and before the connectivity checks for the alternative candidate pair have been completed; and
  wherein if the alternative candidate pair is determined to be valid in the connectivity checks, the established media session is switched to the alternative candidate pair in response.

16. A first device for establishing a media session between the first device and a second device, the first device comprising:
  a network interface;
  a processor configured to implement the following steps:
  determining at the first device, by exchanging network addresses between the devices: (i) a relayed-relayed candidate pair comprising a first media relay server network address available to the first device and a second media relay server network address available to the second device, and (ii) at least one alternative candidate pair comprising a first network address available to the first device and a second network address available to the second device, wherein at least one of those network addresses is a host or reflexive address; and
  in response to a session instigation signal at the first device: establishing via the network interface a media session between the devices using the relayed-relayed candidate pair, and performing connectivity checks for at least the alternative candidate pair to determine whether or not the alternative candidate pair is valid;
  wherein the media session is established using the relayed-relayed candidate pair without any connectivity checks having been performed by the devices for the relayed-relayed candidate pair and before the connectivity checks for the alternative candidate pair have been completed; and
  wherein if the alternative candidate pair is determined to be valid in the connectivity checks, the established media session is switched to the alternative candidate pair in response.

17. A first device according to claim 16, wherein initial media data of the established media session and probe data of the connectivity checks are transmitted and received between the devices via at least one shared connection, and the steps further comprise detecting at the first device a condition of constrained bandwidth for the shared connection.

18. A first device according to claim 17, wherein said establishment of the media session using the relayed-relayed candidate pair is performed in response to said detection of the constrained bandwidth condition.

19. A first device according to claim 17, wherein the probe data is transmitted and received between the devices in the connectivity checks at a data rate that is restricted to account for the constrained bandwidth condition.

20. A first device according to claim 19, wherein the probe data is transmitted and received between the devices at a lower data rate than the initial media data.

* * * * *